(12) United States Patent
Liu et al.

(10) Patent No.: US 11,360,640 B2
(45) Date of Patent: Jun. 14, 2022

(54) METHOD, DEVICE AND BROWSER FOR PRESENTING RECOMMENDED NEWS, AND ELECTRONIC DEVICE

(71) Applicant: Alibaba Group Holding Limited, Grand Cayman (KY)

(72) Inventors: Xiaoli Liu, Guangzhou (CN); Weihan Huo, Guangzhou (CN); Zhewen Su, Guangzhou (CN); Yuanyuan Li, Guangzhou (CN); Ruizhao Lin, Guangzhou (CN); Sijia Chen, Guangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 174 days.

(21) Appl. No.: 15/928,610

(22) Filed: Mar. 22, 2018

(65) Prior Publication Data
US 2018/0275838 A1    Sep. 27, 2018

(30) Foreign Application Priority Data

Mar. 22, 2017   (CN) .......................... 201710173319.8

(51) Int. Cl.
*G06F 3/0482*   (2013.01)
*G06Q 30/06*    (2012.01)
*H04L 67/01*    (2022.01)
*G06Q 30/02*    (2012.01)

(52) U.S. Cl.
CPC ....... *G06F 3/0482* (2013.01); *G06Q 30/0631* (2013.01); *G06F 2203/04806* (2013.01); *G06Q 30/0205* (2013.01); *H04L 67/42* (2013.01)

(58) Field of Classification Search
CPC ........ G06F 3/0482; G06F 2203/04806; G06Q 30/0631; G06Q 30/0205; H04L 67/42
USPC .......................................................... 715/739
See application file for complete search history.

(56) References Cited

U.S. PATENT DOCUMENTS

| 8,489,641 | B1 | 7/2013 | Seefeld et al. | |
| 2007/0288477 | A1* | 12/2007 | Rekimoto | ........... G06F 16/9562 |
| 2009/0132953 | A1* | 5/2009 | Reed, Jr. | ................ G06F 3/0481 |
| | | | | 715/781 |
| 2012/0047129 | A1* | 2/2012 | Redstone | ............... G06Q 10/10 |
| | | | | 707/723 |
| 2014/0082505 | A1* | 3/2014 | Watson | .................. G06Q 50/01 |
| | | | | 715/738 |
| 2014/0317511 | A1* | 10/2014 | Bailiang | ............. G06F 3/04842 |
| | | | | 715/730 |

(Continued)

FOREIGN PATENT DOCUMENTS

| CN | 103020090 | 4/2013 |
| CN | 103324637 | 9/2013 |

(Continued)

*Primary Examiner* — Hope C Sheffield
(74) *Attorney, Agent, or Firm* — Alston & Bird LLP

(57) ABSTRACT

The present invention discloses a method, device and browser for presenting recommended news, and an electronic device. Said method for presenting recommended news comprises: displaying a map; displaying recommended news tags on the map; receiving an operation of a user carried out in respect of the recommended news; and displaying a corresponding recommended news list. A new method for presenting recommended news is provided according to the embodiments of the present invention.

23 Claims, 9 Drawing Sheets

(56) References Cited

U.S. PATENT DOCUMENTS

| | | | | |
|---|---|---|---|---|
| 2015/0128020 A1* | 5/2015 | Chavez | ................ | G06F 17/241 |
| | | | | 715/230 |
| 2015/0186532 A1* | 7/2015 | Agarwal | ............... | G06F 16/951 |
| | | | | 707/722 |
| 2016/0170596 A1* | 6/2016 | Kimura | ................ | G06F 3/0488 |
| | | | | 715/784 |

FOREIGN PATENT DOCUMENTS

| | | |
|---|---|---|
| CN | 104239587 | 12/2014 |
| CN | 104395901 | 3/2015 |
| CN | 104537115 | 4/2015 |
| CN | 104636373 | 5/2015 |

* cited by examiner

< Return    Select City

Please Enter the Name of the City

Current City

Beijing

Current Location

Wudaokou, Haidian District, Beijing

Commonly Selected Cities

Beijing

Shanghai

Guangzhou

Shenzhen

A

Aba

Aksu

FIG. 7

METHOD, DEVICE AND BROWSER FOR PRESENTING RECOMMENDED NEWS, AND ELECTRONIC DEVICE

CROSS-REFERENCE TO RELATED APPLICATION

The present invention claims priority to and benefit of Chinese Patent Application No. 201710173319.8, filed with the State Intellectual Property Office (SIPO) of the People's Republic of China on Mar. 22, 2017, the entire content of which is incorporated by reference into the present application.

TECHNICAL FIELD

The present invention relates to the technical field of browsers, and more specifically to a method, device, and browser for presenting recommended news, and an electronic device.

PRIOR ART

Following the continual popularization and development of smartphones, there has been a gradual trend towards using mobile browsers to access the Internet. With the advances in HTML5 technology, displaying the content of mobile web pages has also become increasingly diversified. Page content may comprise textual information, pictorial information, audio information, and video information, etc., and by means of HTML5 technology, a user is able to interact with web pages, and thus the user experience can be improved. However, when a user looks at news content using a browser, due to the large volumes of data associated with news content, how to accurately determine a user's needs and recommend news content that is of interest to the user is a technical problem which a person skilled in the art constantly strives to resolve.

For example, Chinese patent application CN201280074263.6 discloses a method and system for facilitating a user to obtain content, which is hereby introduced in its entirety as a reference.

As a further example, Chinese patent application CN201510031206.5 discloses a method and apparatus for exploring user interests, which is hereby introduced in its entirety as a reference.

As a further example, Chinese patent application CN201410555495.4 discloses a method and apparatus for refreshing a news list, which is hereby introduced in its entirety as a reference.

As a further example, Chinese patent application CN201310558041.8 discloses a method and apparatus for pushing information, which is hereby introduced in its entirety as a reference.

As a further example, Chinese patent application CN201210079091.3 discloses a method and system for mining hot spot information, which is hereby introduced in its entirety as a reference.

And as yet a further example, Chinese patent application CN201110294227.8 discloses a method and apparatus for providing link recommendations, which is hereby introduced in its entirety as a reference.

In the solutions of the prior art, news is recommended to a user by gathering information from the browser used by the user.

Hence, the provision of a new technical solution is required in order to improve upon at least one of the aforementioned technical problems in the prior art.

SCOPE OF THE INVENTION

The aim of the present invention is to provide a new technical solution for presenting recommended news.

According to a first aspect of the present invention, a method for presenting recommended news is provided, comprising: displaying a map; displaying recommended news tags on the map; receiving an operation of a user carried out in respect of the recommended news; and displaying a corresponding recommended news list.

Optionally or alternatively, displaying the map further comprises: sending a news content request containing geographic location information to a server; receiving a recommendation instruction containing a point of interest tag; displaying the point of interest tag on a web page; and displaying a map in response to the operation carried out by a user in respect of the point of interest tag.

Optionally or alternatively, said method further comprises: identifying geographical location information within web page content, wherein displaying the point of interest tag on the web page comprises: displaying said point of interest tag in the vicinity of the identified content.

Optionally or alternatively, said point of interest tag comprises geographic location information displayed in the form of text.

Optionally or alternatively, the geographic location information is selected by receiving an operation carried out by the user.

Optionally or alternatively, displaying the recommended news tags on the map further comprises: sending a request for recommended news data; receiving a number of recommended news items for at least one point of interest on the map; as well as using said number of recommended news items as the recommended news tags, and marking the corresponding points of interest on the map as recommended news tags.

Optionally or alternatively, said recommended news tags take the shape of a small circle with a number.

Optionally or alternatively, said method further comprises: displaying corresponding recommended news content in response to the operation carried out by a user in respect of the recommended news list.

Optionally or alternatively, said map is displayed by means of a map module, wherein said map module comprises a plug-in or application.

Optionally or alternatively, said recommended news tags are displayed near to the user's current location on the map.

Optionally or alternatively, the area of coverage of said recommended news tags is enlarged or reduced on the basis of zooming in or zooming out of said map.

Optionally or alternatively, when said area of coverage is reduced, the number of news items tagged with the recommended news tags increases, and when said area of coverage increases, the number of news items tagged with said recommended news tag decreases.

Preferably, said map is enlarged or reduced according to a mouse-based operation, wherein when said map is zoomed in on, the recommended news list corresponding to said recommended news tags is a recommended news list for the location of the mouse on the map; and wherein when said map is zoomed out from, the recommended news list corresponding to said recommended news tags is a recommended news list of a higher level administrative region for the location of the mouse on the map.

Preferably, an identifier is provided for each zoom-in or zoom-out operation of said map, wherein other zoom-in or zoom-out operations are forbidden as each zoom-in or zoom-out operation takes place.

Optionally or alternatively, said recommended news tags contain a portion of textual content relating to the recommended news.

Optionally or alternatively, recommended news is sorted within the recommended news list according to the time at which the news content is generated.

Optionally or alternatively, said recommended news list is a list of news from nearby the location of said recommended news tags on the map.

Optionally or alternatively, news is sorted within said recommended news list according to the distance from said recommended news tags on the map.

According to a second aspect of the present invention, a device for presenting recommended news is provided, comprising: an apparatus used to display a map; an apparatus used to display recommended news tags on the map; an apparatus used for receiving an operation of a user carried out in respect of the recommended news; and an apparatus used for displaying a corresponding recommended news list.

According to a third aspect of the present invention, a browser is provided, comprising a device for presenting recommended news according to the present invention, being used to present the recommended news to a user.

According to a fourth aspect of the present invention, a browser is provided, being designed for use in executing operations in the method used to present recommended news according to the present invention.

According to a fifth aspect of the present invention, an electronic device is provided, comprising the browser according to the present invention.

According to a sixth aspect of the present invention, an electronic device is provided, such electronic device comprising a processor, a memory, and a display device, wherein said memory is used to store instructions, said instructions controlling said processor to perform operations so as to execute the method for presenting recommended news according to the present invention in order for recommended news to be displayed on a display apparatus.

According to a seventh aspect of the present invention, an electronic device is provided, comprising: a transceiver apparatus, wherein the transceiver apparatus communicates with a server via a network in order to send a request relating to recommended news and to receive recommended news data sent from the server; a processing apparatus; and a display apparatus, wherein said processing apparatus performs operations in order to execute the method for presenting recommended news according to the present invention, whereby recommended news is displayed on the display apparatus on the basis of the data from the transceiver apparatus.

According to one embodiment of the present invention, a user is able to intuitively select news having occurred at a place of interest, for example, events occurring around the user. By such a means, the user experience can be enhanced.

Other features of the present invention, as well as the advantages thereof, will be made clearer by means of the following detailed description of exemplary embodiments of the present invention with reference to the drawings.

DESCRIPTION OF THE DRAWINGS

The accompanying drawings, which are incorporated in and constitute a part of the description, illustrate embodiments of the present invention and, together with the description, are used to provide an explanation of the principles of the present invention.

FIGS. 6-9 are examples of an embodiment according to the present invention.

DETAILED DESCRIPTION OF THE PREFERRED EMBODIMENTS

A number of exemplary embodiments of the present invention will now be described in detail with reference to the accompanying drawings. It should be noted that unless specifically stated otherwise, the relative arrangement of the components and steps, numerical expressions and numerical values set forth in these embodiments do not limit the scope of the present invention.

The following description of at least one exemplary embodiment is merely illustrative in nature, and should by no means be construed as any limitation on the present invention, its application or use.

Techniques, methods, and devices known to a person of ordinary skill in the relevant art may not be discussed in detail; however, where appropriate, said techniques, methods, and devices shall be considered to be a part of the description.

In all of the examples shown and discussed herein, any specific value should be interpreted as being merely illustrative, and not as a limitation. Therefore, other examples of the exemplary embodiments may have different values.

It should be noted that similar reference numbers and letters are used to express similar terms in the following figures, and therefore, an item need not be further discussed in subsequent figures if already defined in a drawing.

In the embodiments of the present invention, a new method for presenting recommended news is provided.

Various embodiments and examples according to the present invention are described below with reference to the accompanying drawings.

<Method>

Figure 1:
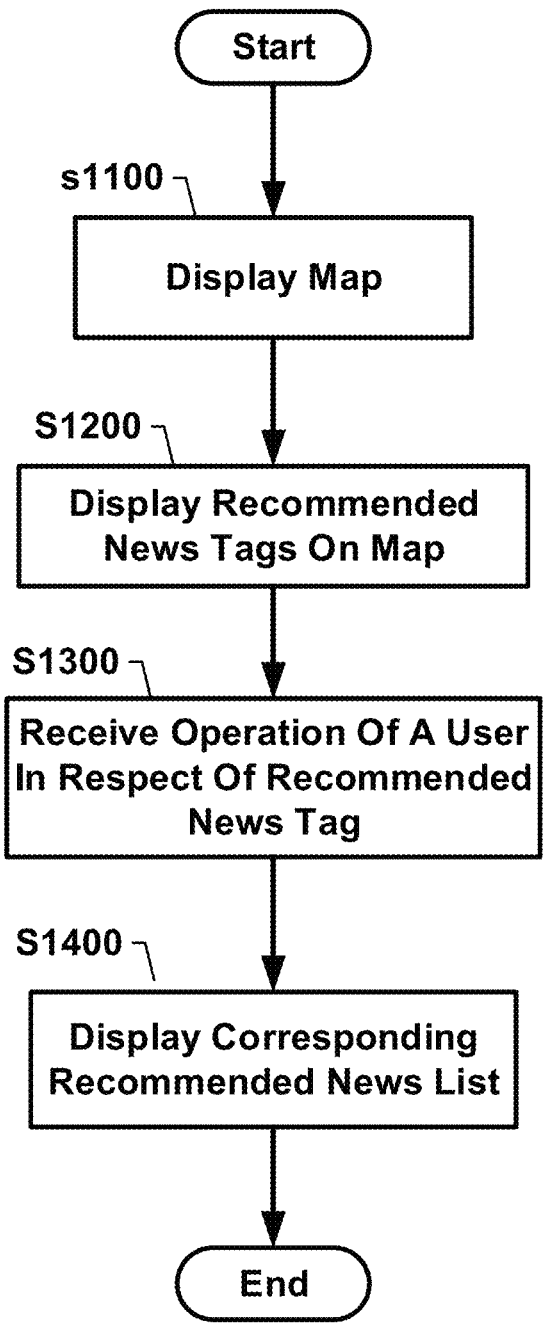
FIG. 1 is a schematic flow chart of a method for presenting recommended news according to one embodiment of the present invention.

FIG. 1 shows a schematic flow chart of a method for presenting recommended news according to one embodiment of the present invention.

As illustrated in FIG. 1, in step S1100, a map is displayed.

The displaying of the map may be initiated in a number of ways.

For example, when a user opens the browser, the browser's default home page is accessed. The map can be displayed on the browser's default home page in order to recommend news to the user. Optionally, the user can open the map by clicking a "Map" tab on the default home page.

In one example, displaying the map is initiated according to news content looked at by the user. For example, when the user opens the browser and reads news displayed in the browser, the browser may send a news content request containing geographic location information to a server, wherein the browser may be located on a client electronic device, and said news content request is a request relating to news read by the user. For example, if the user is interested in news from the Beijing area, he or she may click on a "Beijing" channel tab within the browser. Optionally, the browser will gather news content browsed by the user and determine that all of said news content is news from the Beijing area. The browser may send said request to the server, wherein said request includes the geographical location information "Beijing".

When the server receives said request, it may determine that the user could be interested in news based on the geographic location. The user may, for example, be interested in news happening around them, or be interested in news from their hometown. Accordingly, the server returns a recommendation instruction containing a point of interest tag to the browser. Said recommendation instruction may include recommended news as well as a list thereof, or may only instruct the browser to display the point of interest tag without it including other content. Said point of interest tag is, for example, a tag which represents a geographic location of interest to the user.

The browser receives a recommendation instruction containing a point of interest tag and displays the point of interest tag on a web page, while the user is able to carry out operations in respect of the point of interest tag. For example, the user may click on said tag on a touch screen with a finger, or focus on said tag through the use of a control button and perform a confirmation operation. A map is then displayed in response to the operation carried out by the user in respect of the point of interest tag.

This allows for a more intelligent way to determine the user's interests to be provided, so that a new approach for using a browser may be offered to users.

In another example, a browser can identify geographic location information from the content of a web page, wherein said point of interest tags from the vicinity of the identified content is then displayed. By such a means, users can by guided to browse news based on the map. For example, when browsing the news, a user may be interested in a location mentioned in the news, and click on a point of interest tag near to the corresponding content so as to enter the map and browse the news via the map.

For example, said point of interest tag comprises geographic location information displayed in the form of text. Said point of interest tag may, for example, be a word such as "Beijing" surrounded by a border.

Optionally, the geographic location information may be selected by receiving an operation from the user. For example, there may be a plurality of geographic locations on the page displayed by the browser, and the user may select one of the geographic locations or reselect a new geographic location at a later stage.

In one example, said map is displayed by means of a map module, wherein said map module comprises a plug-in or application. Generally speaking, maps provided through plug-ins or specialized applications provide a better user experience as opposed to maps on web pages.

In step S1200, recommended news tags are displayed on the map. A recommended news tag indicates, for example, news occurring in the vicinity of the geographic location it tags.

In one example, once the user has clicked on a point of interest tag, the browser requests recommended news data from the server. The server acquires a number of recommended news items for at least one point of interest and returns the recommended news to the browser. The browser receives the number of recommended news items for at least one point of interest on the map, and uses said number of recommended news items as the recommended news tags, marking the corresponding points of interest on the map as recommended news tags.

For example, said recommended news tags take, for example, the shape of a small circle with a number, wherein said number indicates the number of recommended news items.

For example, said recommended news tags are, for example, displayed near to the user's current location on the map.

In one example, the user can zoom-in or zoom-out of said map, so that the area of coverage of said recommended news tags may be increased or reduced on the basis of zooming in or zooming out of said map. For example, when said area of coverage is reduced, the number of news items tagged with the recommended news tags increases, and when said area of coverage increases, the number of news items tagged with said recommended news tag decreases. By such a means, the user is able to screen or filter the news they desire by zooming in or out on the map. This provides users with an intuitive way to screen news.

By a user zooming in or out on the map, the shifting points of interest of the user can be shown. For example, said map can be zoomed in or out of according to a mouse-based operation. When said map is zoomed in on, the recommended news list corresponding to said recommended news tags is a recommended news list for the location of the mouse on the map. When said map is zoomed out from, the recommended news list corresponding to said recommended news tags is a recommended news list of a higher-level administrative region for the location of the mouse on the map. The higher-level administrative region may be an administrative region one or more levels higher than the location indicated by said tag. For example, if said tag indicates the Parkson Department Store on Financial Street in the Xicheng District of Beijing, then the higher-level region may be one from Xicheng District or Beijing, etc. A zooming in operation refers to enlarging an area on the map, while the area covered by the current map interface is reduced; for example, the map is zoomed into until instead of displaying the city of Beijing, only Xicheng District is displayed. A zooming out operation refers to an operation which is the opposite of the zooming in operation.

When a user zooms out from the map using a mouse-based operation, they may be interested in news from the specific location of the mouse on the map. A list of news for the specific location may be given to the user.

Conversely, the user enlarging the map may indicate that the user is not interested in a particular location, and news from a wider range can be provided to the user. By such a means, the user's intent can be identified to a certain extent, and a news list which matches the user's intention provided, thus enhancing the user experience.

In addition, in terms of the map operations, the speed of the user's operation may be faster than the map refresh rate. For example, when the network status is poor and the user performs a first zoom-in operation, the client will be slower in refreshing the map due to the slow network speed. At such time, the user is likely to be frustrated and may perform a second zoom-in operation. The server, having not completed the first zoom-in operation, will begin to execute the second zoom-in operation, which may further delay the refreshing and displaying of the map, which will diminish the user experience.

For this reason, in one example, an identifier is provided for each zoom-in or zoom-out operation of said map, wherein other zoom-in or zoom-out operations are forbidden as each zoom-in or zoom-out operation takes place, on the basis of said identifier identifying each zoom-in or zoom-out operation. For example, said identifier indicates that a zoom-in or zoom-out operation is currently being executed, thus prohibiting other zoom-in or zoom-out operations from taking place. Optionally, when the server receives a plurality of operation instructions having different identifiers, it can only execute the operation indicated by the current identifier, while the operations indicated by other identifiers are discarded.

Preferably, the client device may prohibit sending other instructions for zoom-in or zoom-out operations to the server as each respective zoom-in or zoom-out operation takes place. In this way, the processing load of the server can be reduced.

In the solution of said embodiment, the user retrieves news by using the map. Therefore, displaying the map in a timely manner is not the focus of the user. In this case, sacrificing the refresh rate of the map will not diminish the user experience. Conversely, the stability of displaying the map and the news can be maintained by preventing repeated operations by the user.

In one example, said recommended news tags contain a portion of textual content relating to the recommended news. This can provide users with a more intuitive way of learning about the news. Optionally, since said tags are displayed near the geographic location of the user's interest on the map, the user therefore pays more attention to the geographical location and this intuitive approach is more likely to arouse the user's interest in clicking on news items for reading.

In step S1300, an operation of a user carried out in respect of the recommended news is received.

As mentioned above, the user can click on recommended news tags via a touch screen, or focus on said tag through the use of a control button and perform a confirmation operation.

In step S1400, a corresponding recommended news list is displayed.

For example, recommended news is sorted within the recommended news list according to the time at which the news content is generated.

In one example, said recommended news list is a list of news from nearby the location of said recommended news tags on the map. For example, news is sorted within said recommended news list according to the distance from said recommended news tags on the map.

Corresponding recommended news content may then be further displayed in response to the operation carried out by the user in respect of the recommended news list.

In the embodiments of the present invention, a new method for presenting recommended news is provided.

According to the embodiments of the present invention, the recommended news and map may be combined, which can enhance a user's interest in reading. In addition, this approach is intuitive and can enhance the user experience.

According to the embodiments of the present invention, a map may be called on the basis of a web page browsed by a user, which can improve the user experience.

<Device>

A person skilled in the art should understand that in the technical field of electronics, the above-mentioned method can be embodied in products by means of software, hardware, and a combination of software and hardware, while it will be obvious to a person skilled in the art to produce a device for presenting recommended news based on the method as disclosed above. Such a device may comprise an apparatus for implementing the various operations in the previously described method for presenting recommended news. Said device may, for example, comprise: an apparatus used to display a map; an apparatus used to display recommended news tags on the map; an apparatus used for receiving an operation of a user carried out in respect of the recommended news; and an apparatus used for displaying a corresponding recommended news list.

<Browser>

The device for presenting recommended news as described above may be a standalone device (e.g. an application on a client) or may be integrated in a browser as part of such a browser. In this case, a new way of presenting recommended news can be provided by said browser. It should be understood by a person skilled in the art that owing to technological advancements, a browser may be an independent application, e.g. Internet Explorer, Chrome, etc., or may also refer to an application in which browser functions are integrated, such as Weibo, WeChat, Facebook, VK and other such applications.

Figure 2:
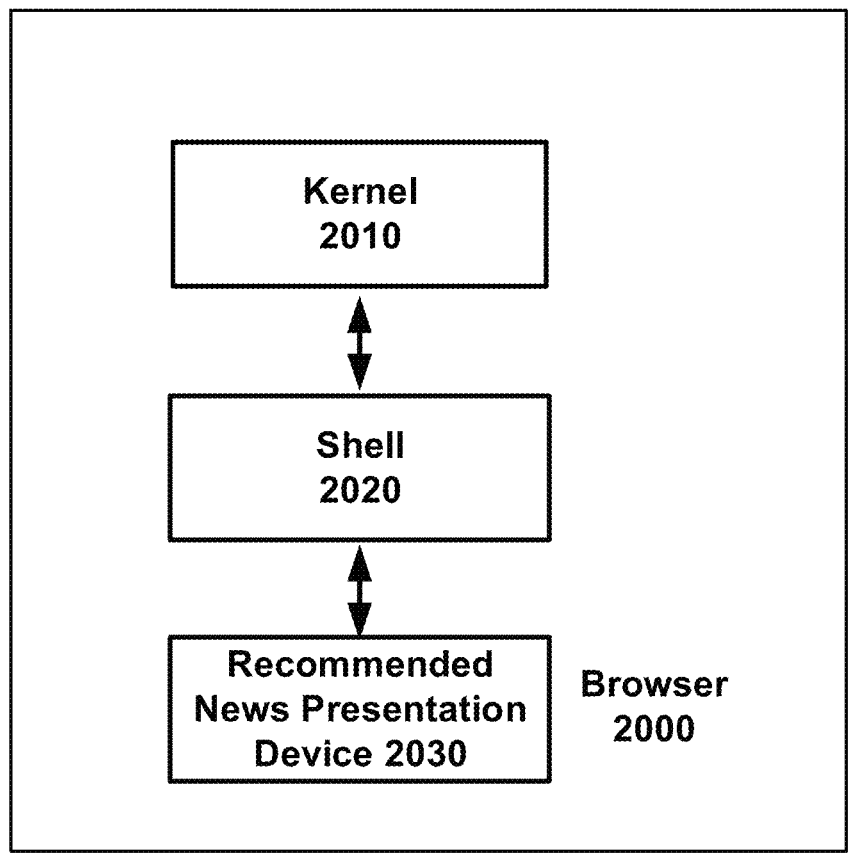
FIG. 2 is a schematic block diagram of a browser according to another embodiment of the present invention.

FIG. 2 is a schematic block diagram of a browser according to another embodiment of the present invention.

In general, the architecture of a browser can be divided into two parts, namely the kernel and the shell. The browser kernel is responsible for interpreting the web page syntax (such as HTML and JavaScript) and rendering (displaying) the web page, i.e. the browser parses and renders the web page by means of the kernel. The browser shell mainly handles the appearance of the browser interface, and controls the experience. In FIG. 2, the browser 2000 comprises a kernel 2010 and a shell 2020. The browser 2000 further comprises a recommended news presentation device 2030 used to present the recommended news to the user. The recommended news presentation device 2030 may be a device for presenting recommended news according to the present invention. Although for clarity, in FIG. 2, the recommended news presentation device 2030 is shown to the outside of the shell 2020 and the kernel 2010, a person skilled in the art will appreciate that the recommended news presentation device 2030 may be located within the shell 2020 or the kernel 2010.

On the other hand, it would be common knowledge to a person skilled in the art that with the development of electronic information technology such as large-scale integration technology in circuits and the trend of hardwarizing software, it has become more difficult to clearly define the boundaries of software and hardware of computer systems. As any operation can be achieved with software, any such operation should be possible to achieve, while any instruction may be executed by hardware, and similarly by software as well. The use of either hardware or software to implement a solution for a certain machine function depends on non-technical factors such as price, speed, reliability, storage capacity, and modification cycle, etc. Therefore, for a person of ordinary skill in the field of electronic information technology, a more direct and clearer way to describe a technical solution is to describe the various operations of the solution. By knowing the operations to be performed, a person skilled in the art is able to directly design the desired product on the basis of considering said non-technical factors. In this respect, in this embodiment, a browser is further provided, said browser being designed in order to execute the operations in the method used to present recommended news according to the embodiments of the present invention as described above.

<Electronic Device>

Various embodiments according to the present invention may be implemented in an electronic device. Said electronic device may, for example, be a laptop, smartphone or tablet, etc.

Figure 3:
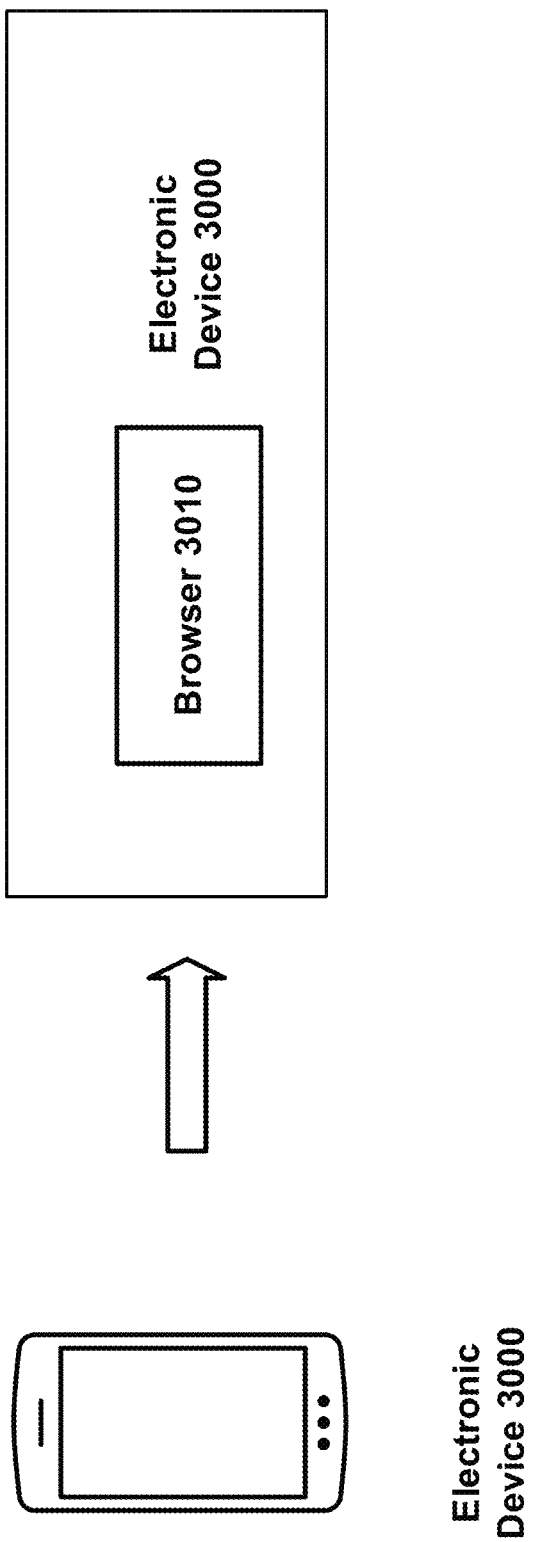
FIG. 3 is a schematic block diagram of an electronic device according to another embodiment of the present invention.

FIG. 3 is a schematic block diagram of an electronic device according to another embodiment of the present invention. As illustrated in FIG. 3, the electronic device 3000 comprises a browser 3010, wherein the browser 3010 is, for example, any one of the browsers described above.

Figure 4:
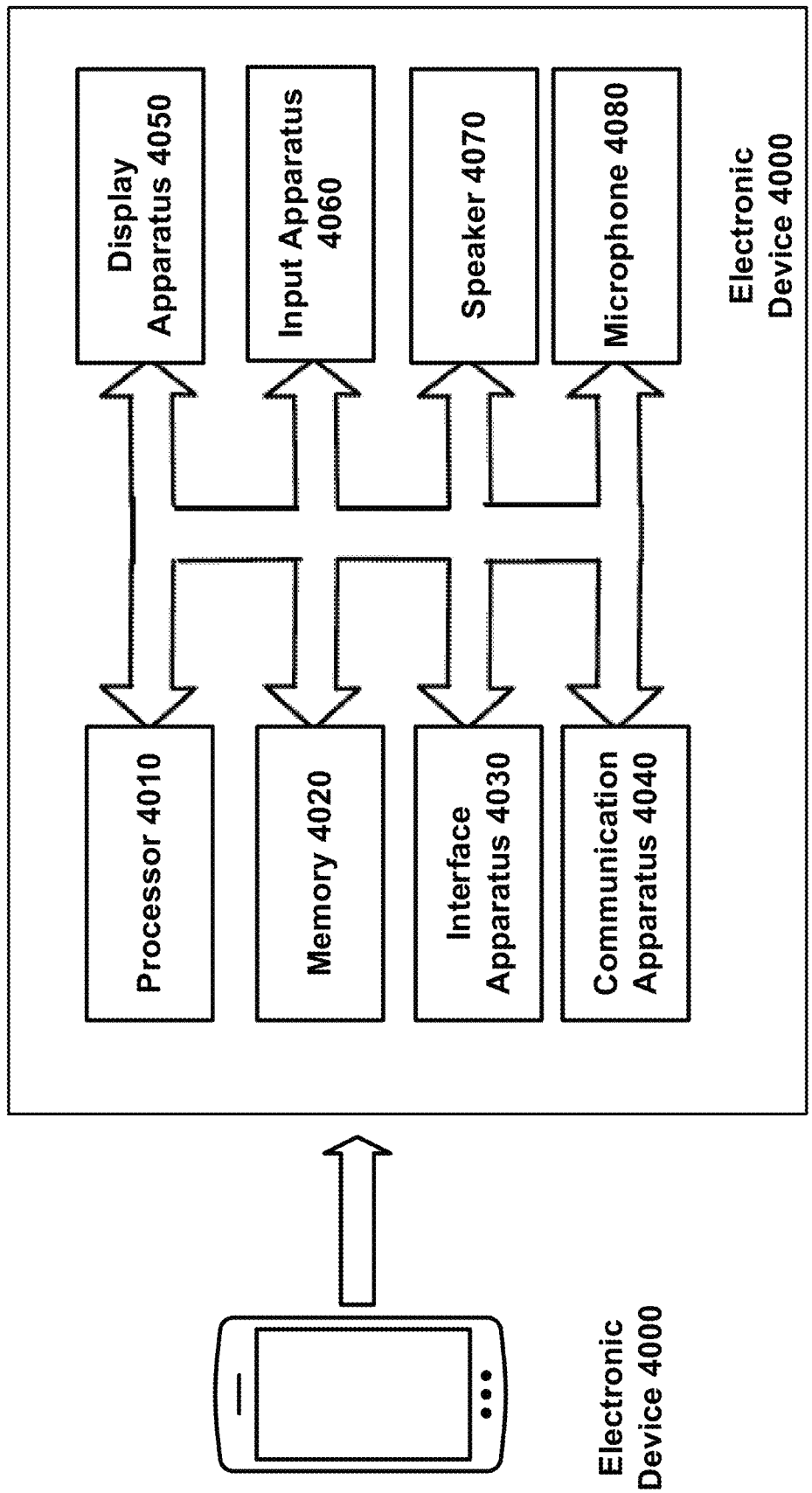
FIG. 4 is a schematic block diagram of an electronic device according to another embodiment of the present invention.

FIG. 4 is a schematic block diagram of an electronic device according to another embodiment of the present invention.

As shown in FIG. 4, the electronic device 4000 may comprise a processor 4010, a memory 4020, an interface apparatus 4030, a communication apparatus 4040, a display apparatus 4050, an input apparatus 4060, a speaker 4070, and a microphone 4080, etc.

The processor 4010 may be, for example, a central processing unit (CPU) or a microprocessor (MCU), etc. The memory 4020 comprises, for example, a read only memory (ROM), a random-access memory (RAM), or a non-volatile memory such as a hard disk, etc. The interface apparatus 4030 comprises, for example, a USB interface, and a headphone jack, etc.

The communication apparatus 4040 can, for example, perform wired or wireless communication.

The display apparatus 4050 is, for example, a liquid crystal display screen or a touch display screen, etc. The input apparatus 4060 may, for example, comprise a touch screen or a keyboard, etc. A user is able to input/output voice information by means of the speaker 4070 and the microphone 4080.

The electronic device as shown in FIG. 4 is merely illustrative, and is in no way intended to limit the present invention, its application or use.

In this embodiment, said memory 4020 is used to store instructions, said instructions controlling said processor 4010 to perform operations in order to execute the method for presenting recommended news as described in the previously referenced FIG. 1 so that recommended news is displayed on a display apparatus. A person skilled in the art should understand that although a plurality of apparatuses is shown in FIG. 4, only some of these apparatuses, for example, the processor 4010 and the storage apparatus 4020, etc., may be involved in the present invention. A skilled person would be able design instructions according to the solution disclosed in the present invention. It is common knowledge in the art as to how instructions control a processor to carry out operations, and as such will not be described in detail here.

Figure 5:
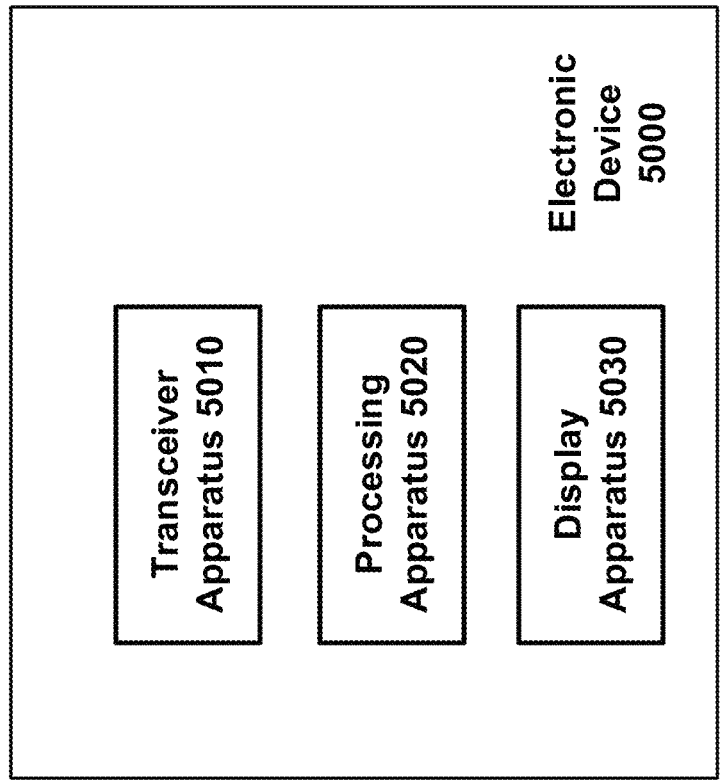
FIG. 5 is a schematic block diagram of an electronic device according to another embodiment of the present invention.
Figure 5:
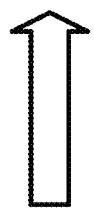
Figure 5:

FIG. 5 is a schematic block diagram of an electronic device according to another embodiment of the present invention.

As shown in FIG. 5, the electronic device 5000 comprises a transceiver apparatus 5010, a processing apparatus 5020, and a display apparatus 5030.

The transceiver apparatus 5010 communicates with a server via a network in order to send a request relating to recommended news and to receive recommended news data sent from the server. The electronic device 5000 is able to communicate with the server via the transceiver apparatus.

Said processing apparatus 5020 performs operations so as to execute the method for presenting recommended news as described in the previously referenced FIG. 1 in order for recommended news to be displayed on the display apparatus 5030 on the basis of the data from the transceiver apparatus 5010.

The electronic device as shown in FIG. 5 is merely illustrative, and is in no way intended to limit the present invention, its application or use.

EXAMPLES

FIGS. 6-9 are examples of one embodiment according to the present invention.

In an example according to the embodiment, news may be recommended to a user based on a point of interest (POI) tag and a recommended news tag of the user. By presenting recommended news with the use of a map, a novel means of use is provided to the user.

A map module may be downloaded by a browser as needed and loaded automatically.

Figure 6:
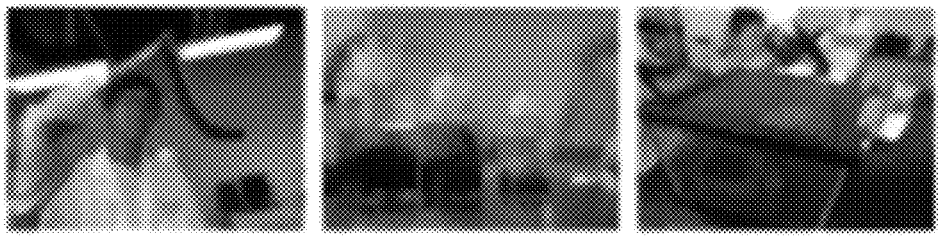

In one example, the user clicks a geographic location channel tab, e.g. "Beijing" in the browser, so that the browser then accesses the "Beijing" channel, as shown in FIG. 6. As shown in FIG. 7, the user can also manually select or reselect the geographic location 100 of the channel tab.

The server sends an instruction with a point of interest tag to the browser according to the geographical location information, wherein said instruction comprises a list of news. Said point of interest may be the user's current location or another location which is of interest to the user. In FIG. 6, reference number 200 indicates an example of a point of interest tag.

Figure 8:
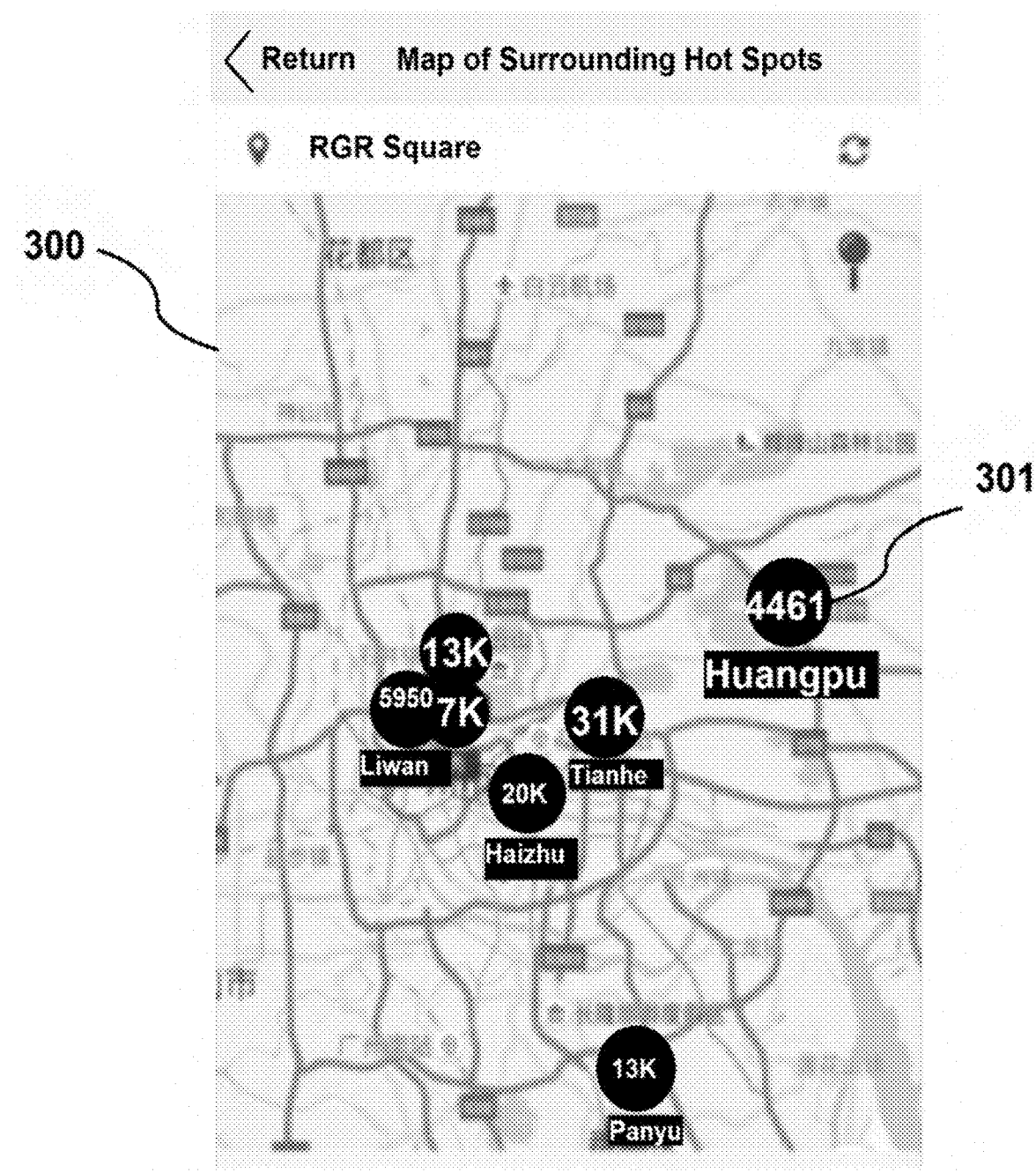

For example, the user clicks the point of interest tag 200 in FIG. 6, and map 300 is displayed, as shown in FIG. 8. In FIG. 8, a recommended news tag 301 is displayed on map 300. The recommended news tag 301 in FIG. 8 is a small circle with a number. The number within small circle 301 indicates the number of recommended news items affixed to the corresponding point of interest.

As the map is zoomed in or zoomed out from, the number in the small circle can also be increased or decreased accordingly. By such a means, the user is able to accurately pinpoint the news he or she is interested in. In addition, users can click on a location plug-in and enter the city selection page in order to change the current city.

The map shown in FIG. 8 is the map of the geographical locations indicated by the point of interest tag in FIG. 6. The numbers in the small circles in FIG. 8 are able to represent the number of recommended news items in each area.

Figure 9:

As illustrated in FIG. 9, when the small circle 401 in map 400 is clicked on, the recommended news list 500 is displayed. The news in recommended news list 500 can be sorted by popularity (the degree of attention paid to this news by all users) or chronologically, etc.

For example, it is also possible to present a news summary on the map (e.g. a headline) using fewer characters in the style of a small flag. By such a means, the map can be more closely integrated with the news, thus further arousing the interest of the user.

The present invention may be a device, method and/or computer program product. The computer program product may comprise a computer-readable storage medium with computer-readable program instructions loaded thereon so that a processor is able to implement the various aspects of the present invention.

The computer-readable storage medium may be a tangible device capable of holding and storing instructions for use by an instruction-executing device. The computer-readable storage medium may be, but is not limited to, an electric storage device, a magnetic storage device, an optical storage device, an electromagnetic storage device, a semiconductor storage device, or any suitable combination of the above. More specific examples (though not an exhaustive list) of computer-readable storage media include: portable computer disks, hard disks, random access memory (RAM), read-only memory (ROM), erasable programmable read-only memory (EPROM or flash memory), static random access memory (SRAM), a portable compact disc read-only memory (CD-ROM), a digital versatile disc (DVD), a memory stick, a floppy disk, a mechanical coding device, for example, a punched card or a raised structure within a groove upon which instructions are stored, as well as any suitable combination of the above. The computer-readable storage medium as used herein is not to be construed as being an instantaneous signal per se, such as radio waves or other freely propagating electromagnetic waves, electromagnetic waves propagated by means of waveguides or other transmission media (e.g. optical pulses through optical fiber cables), or electrical signals transmitted through cables.

The computer-readable program instructions as described herein may be downloaded to various computing/processing devices from a computer-readable storage medium, or downloaded to an external computer or external storage device via a network, such as the Internet, a local area network, a wide area network, and/or a wireless network. Such a network may include copper transmission cables, optical fiber transmission, wireless transmission, routers, firewalls, switches, gateway computers, and/or edge servers. A network adapter card or network interface of each computing/processing device receives computer-readable program instructions from the network and forwards the computer-readable program instructions so that they can be stored in computer-readable storage media of the various computing/processing devices.

The computer program instructions for carrying out operations of the present invention may be in the form of assembly instructions, instruction set architecture (ISA) instructions, machine instructions, machine dependent instructions, microcode or firmware instructions, status setting data, or any combination of source code or object code written in one or more programming languages, wherein said programming languages include an object-oriented programming language such as Smalltalk or C++, etc., as well as conventional procedural programming languages such as the "C" language or similar programming languages. The computer-readable program instructions may be executed entirely on the user's computer, partly on the user's computer, or as a stand-alone software package, partly on the user's computer and partly on a remote computer, or entirely on a remote computer or on a server. In the case of a remote computer, such a remote computer may be connected to the user's computer via any kind of network, including a local area network (LAN) or a wide area network (WAN), or may be connected to an external computer (e.g. via an Internet connection provided by an Internet service provider). In certain embodiments, custom electronic circuits, such as programmable logic circuits, field programmable gate arrays (FPGAs), or programmable logic arrays (PLAs), are personalized by utilizing status information of computer-readable program instructions, wherein said electronic circuits are able to execute the computer-readable program instructions, thus implementing the various aspects of the present invention.

Various aspects of the present invention are described herein with reference to flowcharts and/or block diagrams of the method, apparatus (systems), and computer program products according to the embodiments of the present invention. It should be understood that each box in the flowcharts and/or block diagrams, and combinations thereof, can be implemented by computer-readable program instructions.

Such computer-readable program instructions may be provided to a processor of a general-purpose computer, a special-purpose computer, or of other programmable data processing apparatus, thereby producing a machine such that the instructions, when executed by a processor of a computer or other programmable data processing apparatus, produces an apparatus to implement the function/action specified in one or more boxes in the flowcharts and/or block diagrams. These computer-readable program instructions may also be stored in a computer-readable storage medium so that the instructions result in the computer, the programmable data processing apparatus, and/or other devices to function in a particular manner, the computer-readable medium on which instructions are stored thus comprising a manufactured article, which comprises instructions for implementing various aspects of the functions/actions specified in one or more boxes in the flowcharts and/or block diagrams.

The computer-readable program instructions may also be loaded onto a computer, other programmable data processing apparatus, or other devices so that a series of operational steps are executed on the computer, other programmable data processing apparatus, or other devices, producing a computer-implemented process, whereby the instructions executed on the computer, other programmable data processing apparatus, or other devices thus implementing the functions/actions specified in one or more boxes in the flowcharts and/or block diagrams.

The flowcharts and block diagrams in the figures illustrate the architecture, functionality, and operations of possible implementations of systems, methods, and computer program products according to the various embodiments of the present invention. In this regard, each box in the flowcharts or block diagrams are able to represent a module, program segment, or portion of an instruction wherein said module, program segment, or portion of an instruction comprises one or more executable instructions for implementing a specified logic function. In certain alternative implementations, the functions labeled in the boxes may occur in an order other than as noted in the figures. For example, two consecutive boxes may in fact essentially be executed in parallel, and sometimes may also be executed in reverse order, depending on the functions involved. It should also be noted that each box in the block diagrams and/or flowcharts, and combinations thereof, can be implemented using dedicated hardware-based systems executing specified functions or actions, or may be implemented using a combination of dedicated hardware and computer instructions. It will be common knowledge to a person skilled in the art that implementing by means of hardware, by means of software, and by a combination of software and hardware are all equivalent.

The various embodiments of the present invention have been described above, wherein the foregoing description is exemplary, not exhaustive, and is not intended to be limited to the embodiments disclosed. Numerous modifications and variations will be obvious to a person skilled in the art without departing from the scope and spirit of the embodiments described. The terminology used herein has been chosen to best explain the principles of the embodiments, the practical application or technical improvements in the marketplace, or to enable others of ordinary skill in the art to comprehend the embodiments disclosed herein. The scope of the present invention is defined by the appended claims.

The invention claimed is:

1. A method for presenting recommended news, comprising:
   displaying news article content on a textual web page;
   identifying geographic location information from the news article content displayed on the textual web page and browsed by a user;
   generating a point of interest tag comprising a text describing the geographic location information; displaying the point of interest tag on the textual web page and within a vicinity of the news article content on the textual web page;
   in response to a user selection of the point of interest tag, triggering displaying a map interface and a plurality of recommended news tags on the map interface indicating a plurality of recommended news items, wherein the method further comprises:
   upon receiving the user selection of the point of interest tag, transmitting, to a server, a recommended news request for the plurality of recommended news items associated with the point of interest tag,
   receiving, from the server, the plurality of recommended news items in response to the recommended news request, and
   generating, on the map interface, the plurality of recommended news tags based on the plurality of recommended news items;
   receiving an operation of the user carried out in respect of at least one of the plurality of recommended news tags; and
   displaying a recommended news list comprising the plurality of recommended news items, wherein the method further comprises:
      sorting the plurality of recommended news items according to a plurality of recommended news item generation time, wherein each of the plurality of recommended news item generation time indicates when one of the plurality of recommended news items is generated, wherein each of the plurality of recommended news items describes an event occurred at an event time different from a corresponding recommended news item generation time of each of the plurality of recommended news items.

2. The method according to claim 1, further comprising: sending a news content request containing the geographic location information to the server; and receiving a recommendation instruction containing the point of interest tag.

3. The method according to claim 2, wherein the geographic location information is selected by receiving an operation carried out by the user.

4. The method according to claim 1, wherein displaying the plurality of recommended news tags on the map interface further comprises: sending a request for recommended news data; receiving a number of recommended news items for at least one point of interest on the map interface; using said number of recommended news items as the plurality of recommended news tags, and marking corresponding points of interest on the map interface based on the plurality of recommended news tags.

5. The method according to claim 4, wherein each of said plurality of recommended news tags takes a shape of a small circle with a number.

6. The method according to claim 1, further comprising: displaying corresponding recommended news content in response to an operation carried out by the user in respect of the recommended news list.

7. The method according to claim 1, wherein said map interface is displayed by means of a map module, and said map module comprises a plug-in or application.

8. The method according to claim 1, wherein said plurality of recommended news tags are displayed near a current location associated with the user on the map interface.

9. The method according to claim 1, wherein an area of coverage of said plurality of recommended news tags is increased based on zooming out of said map interface, and is reduced based on zooming in of said map interface.

10. The method according to claim 9, wherein when said area of coverage is reduced, a number of news items tagged with the plurality of recommended news tags increases, and when said area of coverage increases, the number of news items tagged with said plurality of recommended news tags decreases.

11. The method according to claim 9, wherein said map interface can be zoomed in or out of according to a mouse-based operation, wherein when said map interface is zoomed in on, the recommended news list corresponding to said plurality of recommended news tags is a recommended news list for a location of a mouse on the map interface; and wherein when said map interface is zoomed out from, the recommended news list corresponding to said plurality of recommended news tags is a recommended news list of a higher level administrative region for the location of the mouse on the map interface.

12. The method according to claim 9, wherein an identifier is provided for a first zoom-in operation of said map interface, and wherein a second zoom-out operation is forbidden as the first zoom-in operation takes place based on said identifier identifying the first zoom-in operation.

13. The method according to claim 1, wherein each of said plurality of recommended news tags contain a portion of textual content relating to the recommended news.

14. The method according to claim 1, wherein said recommended news list comprises a list of recommended news items from nearby locations of said at least one of the plurality of recommended news tags on the map interface.

15. The method according to claim 14, further comprising: sorting the plurality of recommended news items according to a plurality of distances from a location of said at least one of the plurality of recommended news tags on the map interface to a location described in a corresponding recommended news item on the list of recommended news items on the map interface.

16. An electronic device comprising a processor, a memory, and a display device, wherein said memory is used to store instructions, said instructions controlling said processor to perform operations so as to execute the method for presenting the recommended news according to claim 1 for recommended news to be displayed on a display apparatus.

17. An electronic device comprising: a transceiver apparatus, wherein said transceiver apparatus communicates with the server via a network to send a request relating to recommended news and to receive recommended news data sent from the server; a processing apparatus; and a display apparatus, wherein said processing apparatus performs operations so as to execute the method for presenting recommended news according to claim 1 for the recommended news to be displayed on the display apparatus based on data from the transceiver apparatus.

18. A computer program product comprising at least one non-transitory computer-readable storage medium having computer-readable program code portions stored therein, the computer-readable program code portions comprising an executable portion configured to present the recommended news according to claim 1.

19. The method accordingly to claim 1, wherein identifying the geographic location information from the news article content displayed on the textual web page further comprises: gathering the news article content browsed by the user; and determining that the news article content is associated with a geographic area.

20. The method according to claim 1, wherein, when displaying the point of interest tag, the method further comprises: displaying the point of interest tag between news article content on the textual web page.

21. An apparatus comprising at least one processor and at least one memory comprising program code, the at least one memory and the program code configured to, with the at least one processor, cause the apparatus to at least:
- display news article content on a textual web page;
- identify geographic location information from the news article content displayed on the textual web page and browsed by a user;
- generate a point of interest tag comprising a text describing the geographic location information;
- display the point of interest tag on the textual web page and within a vicinity of the news article content on the textual web page;
- in response to a user selection of the point of interest tag, trigger displaying a map interface and a plurality of recommended news tags on the map interface indicating a plurality of recommended news items, wherein the at least one memory and the program code are configured to cause the apparatus to:
  - upon receiving the user selection of the point of interest tag, transmit, to a server, a recommended news request for the plurality of recommended news items associated with the point of interest tag,
  - receive, from the server, the plurality of recommended news items in response to the recommended news request, and
  - generate, on the map interface, the plurality of recommended news tags based on the plurality of recommended news items;
- receive an operation of the user carried out in respect of at least one of the plurality of recommended news tags; and
- display a corresponding recommended news comprising the plurality of recommended news items, wherein the at least one memory and the program code are configured to, with the at least one processor, cause the apparatus to:
  - sort the plurality of recommended news items according to a plurality of recommended news item generation time, wherein each of the plurality of recommended news item generation time indicates when one of the plurality of recommended news items is generated, wherein each of the plurality of recommended news items describes an event occurred at an event time different from a corresponding recommended news item generation time of each of the plurality of recommended news items.

22. A browser computer, comprising the apparatus for presenting the recommended news according to claim 21, which is used to present the recommended news to the user.

23. An electronic device comprising the browser computer according to claim 22.

* * * * *